Figure 1:
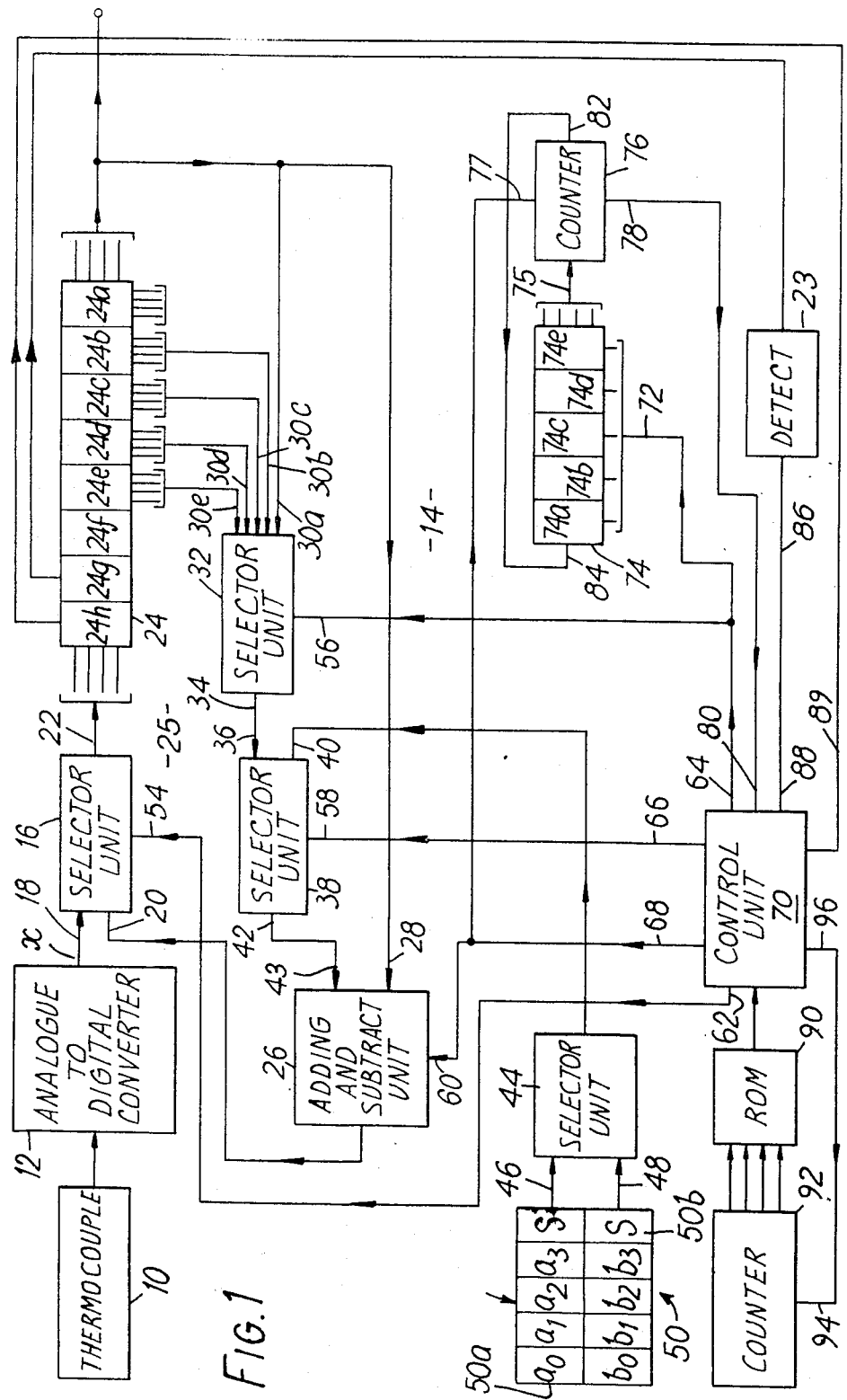

United States Patent [19]
Cooke

[11] 3,953,718
[45] Apr. 27, 1976

[54] DIGITAL CALCULATING APPARATUS

[75] Inventor: Robert John Cooke, Farnborough, England

[73] Assignee: The Solartron Electronic Group Ltd., Farnborough, England

[22] Filed: July 19, 1974

[21] Appl. No.: 490,175

[30] Foreign Application Priority Data
July 31, 1973 United Kingdom............... 36325/73

[52] U.S. Cl................................ 235/156; 235/165; 340/347 AD
[51] Int. Cl.$^2$....................... G06F 7/48; G06F 7/52
[58] Field of Search ........... 235/156, 197, 180, 158, 235/159, 164, 165, 167; 340/347 AD, 172.5

[56] References Cited
UNITED STATES PATENTS

| 3,686,665 | 8/1972 | Elias et al. .................. 340/347 AD |
| 3,699,318 | 10/1972 | Underkoffler et al. ......... 340/347 AD |
| 3,701,145 | 10/1972 | Bergin .......................... 340/347 NT |

FOREIGN PATENTS OR APPLICATIONS

| 1,321,067 | 6/1973 | United Kingdom |
| 1,356,986 | 2/1964 | France |

Primary Examiner—Charles E. Atkinson
Assistant Examiner—Errol A. Krass
Attorney, Agent, or Firm—William R. Sherman; Kevin McMahon

[57] ABSTRACT

Digital calculating apparatus, which is particularly suitable for linearizing a digitized output signal produced by a non-linear transducer such as a thermocouple, comprises a store connected in a recirculating loop including combined adder and subtractor circuit, means for changing a number entered in the store to a predetermined target value by a linear or an exponential progression involving groups of N adding or subtracting-cycles, means for counting and storing the numbers of groups of cycles required to achieve the target value, and means for entering another number in the store and subjecting it to the same numbers of groups of M adding or substracting cycles, where M ≤ N, to produce the required answer. For linearizing the digitized output signal x from a thermocouple, where x is given by $T = a_0 + a_1 x + a_2 x^2 + \ldots + a_n x^n$, the apparatus is used, with M=N=1, to generate the reciprocal Y of X, and then used to perform successive add and divide recursions to evaluate the equation $$T = \left[\left[\left(\frac{a_n}{Y} + a_{n-1}\right)\frac{1}{Y} + a_{n-2}\right]\frac{1}{Y} + a_1\right]\frac{1}{Y} + a_0.$$

9 Claims, 2 Drawing Figures

DIGITAL CALCULATING APPARATUS

This invention relates to digital calculating apparatus for calculating a wide variety of functions of one or more independent variables, and is more particularly but not exclusively concerned with such digital calculating apparatus which is especially suitable for linearizing a digitized output signal derived from a transducer having a non-linear output characteristic, such as a thermocouple or a resistance thermometer.

It is generally accepted that it is very desirable for a measurement system employing a transducer, such as a thermocouple or a resistance thermometer, to include means for converting the output signal of the transducer, which output signal is typically an analogue electrical signal, to an output indication in normal engineering units, e.g. degrees Centigrade in the case of the transducers mentioned. Since such transducers usually have a non-linear output characteristic, the conversion means must perform a linearizing operation. It is known to use an analogue conversion circuit to linearize the analogue output signal produced by the transducer, but the accuracy of conversion attainable by such a circuit is not very great. Further, such an analogue conversion circuit must normally be specifically designed for use with one particular kind of transducer, and is therefore not capable of being used in conjunction with other kinds of transducer. For greater accuracy and greater flexibility of application, it is therefore preferable to convert the analogue output signal from the transducer to digital form, and then to use a digital technique to achieve linearization.

Typically, the variation with temperature of the output signal produced by a thermocouple over its normal operating range may be described, to within a predetermined accuracy, by an empirically determined seventh or eighth order polynomial function. Once the values of the coefficients of the function have been determined, therefore, linearization of the output signal can be effected by applying a digitized version thereof to digital calculating apparatus, which is arranged to calculate the value of the function corresponding to the magnitude of the applied output signal. However, the determination of the coefficients of a suitable polynomial function of this order is extremely complex, and digital calculating apparatus for calculating the value of the function is also complex, and relatively expensive. It is therefore one object of the present invention to provide digital calculating apparatus suitable for linearizing the output signal of a transducer, such as a thermocouple or a resistance thermometer, which apparatus is relatively simple and economical in terms of the digital circuitry required to achieve a given accuracy of linearization.

One known form of digital calculating apparatus which is suitable for use in linearizing the output signal produced by a transducer is described and claimed in the specification of U.S. Pat. No. 3,746,849 assigned to the assignee of this invention, and comprises two shift register stores means for entering initial values in the stores, each store being connected in a recirculating loop which includes a combining circuit arranged to cause the number in the store to change by linear progression or exponential progression as successive recirculations are effected under the action of control means, the control means being adapted to cause one loop to undergo groups of N adding or subtracting cycles, where N is 1 or another integer, to cause the other loop to undergo groups of M adding or subtractng cycles, where M is an integer equal to or less than N, and to cause the number in one of the stores to converge upon a predetermined final value. The terms "linear progression" and "exponential progression" are defined in the aforementioned Patent Specification, and will be used in the same sense herein. It is a further object of the present invention to provide a modification of the digital calculating apparatus of the aforementioned Patent Specification, which modification is particularly suitable for linearizing the output signal of a transducer and is more economical to implement.

In accordance with the present invention, there is provided digital calculating apparatus comprising a store, means for entering a first number in the store, said store being connected in a recirculating loop which includes a combining circuit arranged to change the number in said store by linear progression or exponential progression, control means for effecting successive circulations of said loop so that said combining circuit performs a plurality of successive groups of N adding or subtracting cycles, where N=1 or another integer, whereby the number in said store converges upon a predetermined target value by one of said progressions, counter means for counting and storing the number of N adding or subtracting cycles in each of said groups, and means for subsequently entering a second number in said store, the control means being responsive to the counter means to effect further successive circulations of said loop so that the combining circuit performs a plurality of further groups of M adding or subtracting cycles, where M is an integer equal to or less than N, the number of M adding or subtracting cycles in each of said further groups being the same as the number of N adding or subtracting cycles in the corresponding ones of the first-mentioned groups, whereby to change said second number by one of said progressions to the required answer.

Thus instead of using two stores with their respective recirculating loops, and simultaneously changing the respective numbers in them by linear progression or exponential progression, as described in the aforementioned Patent Specification, the digital calculating apparatus of the present invention uses a single store connected in a recirculating loop, and changes the number therein to a predetermined target value by linear porgression or exponential progression while storing data defining the operations required to effect the change. A new number can then be inserted in the same store, and changed by a linear or exponential progression which is controlled in dependence on the stored data and which produces the required answer. In effect, the digital calculating apparatus of the present invention uses one store, and performs successive linear or exponential progressions on the contents thereof, rather than performing simultaneous progressions on the respective contents of two stores. It will be appreciated, however, that the digital calculating apparatus of the present invention is capable of performing all the calculations performed by the apparatus of the aforementioned Patent Specification, including division, square rooting, and deriving logarithms to the base ten.

In a preferred embodiment of the invention, especially adapted for linearizing a digital signal $x$ which varies in accordance with at least one polynomial function of at least the second order and which may for example be a digitized output signal derived from a transducer having a non-linear characteristic, the integers N and M are both equal to one, and there is provided a yet further store for storing the coefficients of said at least one polynomial function of x, the arrangement being such that, in operation, the reciprocal of $x$ is entered in the first mentioned store as said first number and changed by exponential progression to a target value of one, the highest order coefficient is entered into the first mentioned store as said second number and changed by exponential progression, in response to the stored numbers in the counter means, whereby to divide said highest order coefficient by said reciprocal, the remaining coefficients down to the first order coefficient are successively additively entered in the first mentioned store in decreasing order, the number in the first mentioned store after each addition being changed by exponential progression, in response to said stored numbers in the counter means, whereby to divide the number in the first mentioned store after each addition by said reciprocal, and the final (i.e. zero-th order) coefficient is additively entered in the first mentioned store.

Said reciprocal of $x$ may be entered in the first mentioned store in a preliminary operation, in which $x$ is entered in the first mentioned store as said first number and changed by exponential progression to a target value of one, which target value serves as the second number and is changed by exponential progression, in response to the stored numbers in the counter means, whereby to produce said reciprocal.

Figure 2:
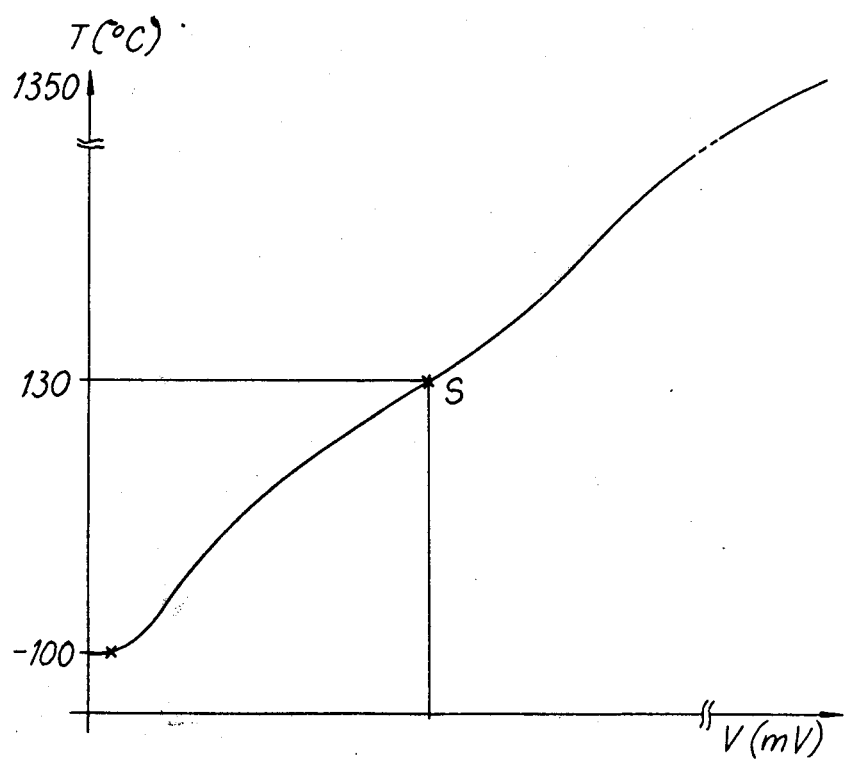

The invention will now be described, by way of non-limitative example only, with reference to the accompanying drawings, of which:

FIG. 1 is a block schematic diagram of digital calculating apparatus in accordance with the present invention, shown connected for use in linearizing the output signal produced by a thermocouple; and FIG. 2 is a graphical representation of the output characteristic of the thermocouple of FIG. 1, i.e. the variation with temperature of the output signal produced by the thermocouple.

Referring to FIG. 1, the thermocouple is indicated generally at 10, and may for example be a Chromel Alumel thermocouple conforming to British Standard 1827 of 1952, and have a typical operating range of −100°C to +1350°C over which it is desired to measure the temperature to an accuracy of ± 1°C. The output characteristic of the thermocouple 10 shown in FIG. 2, can be described if desired by a single polynomial function, but to cover even the restricted range of −50°C to +600°C to the required accuracy necessitates the use of a fifth order function: to cover the whole range would obviously require a function of much higher order. However, we have discovered that if the output characteristic of the thermocouple 10 is divided into two portions which respectively extend downwardly and upwardly from the point S, where S is the magnitude of the output signal produced by the transducer 10 corresponding to a temperature of 130°C, then the portions extending from −100°C to +130°C and from +130° C to 1350°C can each be described to the required accuracy by a respective third order function, i.e. from $$-100°C \text{ to } +130°C, T = a_o + a_1x + a_2x^2 + a_3x^3 \quad 1$$

and from $$+130°C \text{ to } +1350°C, T = b_o + b_1x + b_2x^2 + b_3x^3 \quad 2$$

The coefficients $a_o$ to $a_3$ and $b_o$ to $b_3$ are calculated in known manner, typically in a computer, by measuring or deriving from published tables the magnitude of the output signal produced by the thermocouple 10 at a plurality of reference temperatures throughout each of the two portions of its characteristic, to define a plurality of points on each portion, and then calculating the respective third order polynomial functions which are a least squares fit with the respective points on each portion.

In order to linearize the output signal produced by the thermocouple 10, the output signal is first applied to an analogue-to-digital converter 12, as shown in FIG. 1. The converter 12 may be of any convenient form, and converts the output signal to a digital signal $x$ representative of the modulus and sign of the output signal. Typically, the digital signal $x$ is in decade-serial, bit-parallel BCD form and has up to six decades of resolution. This digital signal is then applied to the digital calculating apparatus, which is indicated generally at 14.

The digital calculating apparatus 14 comprises a selector unit 16 having a first input 18 connected to receive the digital signal $x$, a second input 20 and an output 22. The selector unit 16 may typically comprise a plurality of AND gates, and it operates to selectively route either the signal at its input 18 or the signal at its input 20 to its output 22. The output 22 of the selector unit 16 is connected to the input of a store 24, which is illustrated for convenience as, and will hereinafter be referred to as, a shift register store. However, if desired the store 24 may be constituted by a random access store (RAM). The register 24 comprises a plurality of decade stages 24a to 24h (in increasing order of significance), of which the most significant stage 24h serves for storing a polarity bit, and the next most significant stage 24g is connected to a detector 23 which detects the presence of a 0 or a 1 in this stage.

The register 24 is connected in a recirculating loop 25 which includes a combining circuit constituted by a BCD adding and substracting unit 26. To achieve this, the output of the least significant stage 24a is connected to one input 28 of the adding and subtracting unit 26, and the output of the unit 26 is connected to the second input 20 of the selector unit 16. The output of the stage 24a, together with an output of each of the succeeding stages 24b to 24e, is also connected to a respective input 30a to 30e of a further selector unit 32, which has an output 34 connected to an input 36 of yet another selector unit 38. The selector unit 38 has a second input 40, and is very similar to the selector unit 16: its output 42 is connected to a second input 42 of the adding and subtracting unit 26.

It will be appreciated that the above described arrangement of the register 24 in its recirculating loop 25 is closely similar to the arrangement of the register 12 shown in FIG. 1 of the aforementioned Patent Specification. Thus, the adding and subtracting unit 26 mentioned hereinbefore can be implemented by means of the full adders 14, 16 and associated carry circuit and circuit 18 of FIG. 1 of the aforementioned Patent Specification, while the selector unit 32 mentioned hereinbefore can be implemented by means of the AND gates 22, 26 . . . of FIG. 1 of the aforementioned Patent Specification.

The second input 40 of the selector unit 38 is connected to the output of a further selector unit 44, which is again similar to the selector unit 16 and has two inputs 46, 48 connected to receive respective signals from a read-only memory 50 (ROM). The ROM 50 is divided into first and second zones 50a and 50b respectively, the output of the zone 50a being connected to the input 46 and the output of the zone 50b being connected to the input 48. Respective digital signals representative of the aforementioned coefficients $a_0$, $a_1$, $a_2$ and $a_3$ and the aforementioned magnitude S are stored in the first zone 50a, while respective digital signals representative of the coefficients $b_0$, $b_1$, $b_2$ and $b_3$ and the magnitude S are stored in the second zone 50b, negative numbers being stored in tens complement form.

The selector units 16, 32 and 38 and the adding and subtracting unit 26 each have a respective control input 54, 56, 58, 60 connected to a respective control output 62, 64, 66, 68 of a control unit 70. The control output 64 of the control unit 70 is also connected to a control input 72 of an auxiliary store 74, again illustrated, merely for the sake of convenience, as a shift register store. The auxiliary store 74 typically has five stages 74a to 74e, and an output 75 whereby the contents of a selected one of the stages may be read out into a counter 76. The counter 76 has a count input 77 connected to the control output 68 of the control unit 70, and a detect zero output 78 connected to a control input 80 of the control unit 70. Additionally, the counter 76 has a count output 82 connected to an input 84 of the auxiliary store 74, whereby the count in the counter 76 may be transferred into a selected one of the stages 74a to 74d.

The detector 23 has an output 86 which is connected to a further control input 88 of the control unit 70, while the stage 24h of the register 24 has a polarity bit output which is connected to yet another input 89 of the control unit 70.

The control unit 70 comprises, in known manner, a clock pulse generator (not shown) and a matrix-type array of gates or similar logic elements (not shown), which are so arranged that the various control outputs of the unit 70 are energized in a predetermined manner or combination in response to programme control signals produced by a further ROM 90. The ROM 90 has a plurality of these programme control signals stored therein, each signal representing a desired operation or group of operations to be performed by the digital calculating apparatus 14. The ROM 90 is connected to be addressed by a counter 92, which has a count input 94 connected to a further control output 96 of the control unit 70. Each time a desired operation or group of operations currently being carried out in the digital calculating apparatus 14 under the control of the control unit 70, in response to the currently addressed programme control signal from the ROM 90, is completed, the control unit 70 produces an "operation complete" signal at its control output 96. This operation complete signal advances the count of the counter 92, which thus addresses the next desired programme control signal in the ROM 90 and thereby causes the control unit 70 to initiate the next desired operation or group of operations. In this way, the control unit 70 is programmed to control the digital calculating apparatus 14 to perform the complete sequence of operations or groups of operations necessary for linearizing the output signal produced by the transducer 10, as will hereinafter be described in detail.

Thus, in operation, the control unit 70 is first programmed to select the input 18 of the selector unit 16 (i.e. to set the unit 16 to connect the first input 18 thereof to the output 22 thereof), and the digital signal $x$ from the analogue-to-digital converter 12 is entered via the unit 16 into the register 24. After the digital signal $x$ has been entered in the register 24, the control unit selects the input 20 of the selector unit 16 for the duration of the calculations to follow, and transforms $x$ into tens complement form if $x$ is negative. The control unit 70 then selects the input 40 of the selector unit 38, thereby applying either one of the identical digital signals S from the zones 50a or 50b in the ROM 50 to the input 43 of the adding and subtracting unit 26 via the selector unit 44 (which may initially be set to either of its two routing states) and the selector unit 38, and sets the adding and subtracting unit 26 to subtract by applying a suitable control signal to the control input 60 thereof. A recirculation of the loop 25 including the register 24 and unit 26 is then effected under the control of the control unit 70, whereby S is subtracted from $x$ and the difference is entered in the register 24. If this difference is negative, as determined by the polarity bit in the stage 24h, then $x < S$, and the control unit 70 selects the input 46 of the selector unit 44, whereby the coefficients $a_0, a_1, a_2, a_3$ in the zone 50a of the ROM 50 may be read out for use in the calculations to follow. Similarly, if the difference is positive, then $x > S$, and the control unit 70 selects the input 48 of the selector unit 44, so that the coefficients $b_0, b_1, b_2, b_3$ in the zone 50b may be read out for the calculations.

Once $x$ has been compared with S as described in the preceding paragraph, the control unit 70 sets the adding and subtracting unit 26 to add, and effects another recirculation of the loop 25, so as to add S to the number in the register 24. The result of this recirculation is to restore the number in the register 24 to $x$. The number $x$ is then normalised under the control of the control unit 70 for the remaining calculations, the normalisation merely comprising restoring $x$ if necessary to sign and modulus form and then right shifting or left shifting (i.e. multiplying or dividing by a power of 10) to bring the value of $x$ into the range 0.1 to 1.0.

Assuming that $x$ was smaller than S, a convenient way of implementing equation (1) is to generate a number $Y = 1/x$ and then to evaluate the equation $$T = \left[\left(\frac{a_3}{Y} + a_2\right) \frac{1}{Y} + a_1\right] \frac{1}{Y} + a_0, \quad (3)$$

which is an add and divide recursion for which the digital calculating apparatus 14 is particularly suitable.

Thus to implement equation (3) the control unit 70 first generates the number Y, by effecting successive recirculations of the loop 25 so as to cause the number $x$ therein to converge to a target value of 1 by exponential progression. To achieve this, the control unit 70 selects the inputs 30a and 36 of the selector units 32 and 38 respectively, and then causes the adding and subtracting unit 26 to repeatedly add the number in the register 24 to itself (i.e. repeatedly doubles the number in the register 24) until the number in the register 24 exceeds 1, as indicated by the detector 23. The number $n_0$ of additions required are counted by the counter 76 (which counts the number of control signals produced at the output 68 of the control unit 70), and entered into the stage 74a of the register 74. The control unit 70 next selects the input 30b of the selector unit 32, sets the adding and subtracting unit 26 to subtract and then effects successive recirculations of the loop 25, so that the unit 26 repeatedly subtracts one tenth of the number in the register 24 from itself. This process continues until the number in the register 24 falls below 1 again, as indicated by the detector 23, whereupon the number $n_1$ of subtractions performed by the unit 26 and counted by the counter 76 is entered into the stage 74b of the counter. In an exactly analogous manner, the number in the register 24 is repeatedly added to one hundredth of itself (using input 30c of the selector unit 32) until it again exceeds 1, the number $n_2$ of additions required being stored in the stage 74c of the register 74, then one thousandth of the number (using the input 30d of the selector unit 32) is repeatedly subtracted from itself $n_3$ times, and finally the number is repeatedly added to one ten thousandth of itself (using the input 30e of the selector unit 32) $n_4$ times, $n_3$ and $n_4$ being stored in the stages 74d and 74e respectively of the register 74. As each of the numbers $n_0$ to $n_4$ is successively generated, the number in the register 24 converges successively more closely on the target value of 1.

As explained in the aforementioned Patent Specification, the sequence of operations described in the preceding paragraph is equivalent to multiplication by an operator E given by $$E = 2^{n_0} \cdot (1-0.1)^{n_1} \cdot (1+0.01)^{n_2} \cdot (1-0.001)^{n_3} \cdot (1+0.0001)^{n_4}$$

Thus $$x.E = 1, \text{ or } E = 1/x$$

At this point the number in the register 24 is 1 to a very close approximation, and this number is multiplied by the operator E to change the number in the register 24 to $1/x = Y$, by repeating the $n_0$ to $n_4$ additions and subtractions described above in the order described above. Thus the control unit 70 addresses the stage 74a of the register 74 via the control output 64, thereby non-destructively reading out $n_0$ via the output 75 into the counter 76, and simultaneously selects the input 30a of the selector unit 32 by way of the same control output 64. The adding and subtracting unit 26 then performs $n_0$ additions of the number in the register 24 to itself under the control of the control unit 70, each addition decrementing the count in the counter 76 by one via the control output 68 and count input 77. When $n_0$ additions have been effected, the count in the counter 76 reaches zero, and a signal appears at its output 78. This signal causes the control unit 70 to address the stage 74b of the register 74 and to simultaneously select the input 30b of the selector unit 32, whereupon the unit 26 performs $n_1$ subtractions of the tenth of the number in the register 24 from itself. In a similar manner, $n_2$ additions of one hundredth of the number in the register 24 to itself, then $n_3$ subtractions of one thousandth of the number in the register 24 from itself and finally $n_4$ additions of one ten thousandth of the number in the register 24 to itself are performed. At this point, the number in the register 24 is $$1 \times E = 1 \times 1/x = Y \qquad 5$$

The number Y now in the register 24 is then changed by exponential progression to a target value of 1 as hereinbefore described with reference to the number $x$, thus generating new numbers $n_0'$, $n_1'$, $n_2'$, $n_3'$ and $n_4'$ which are entered in the register 74 and which correspond to a new operator E' given by $$E' = 1/Y = x \qquad 6$$

The new numbers $n_0'$ to $n_4'$ over-write the old number $n_0$ to $n_4$ in the register 74.

The digital calculating apparatus 14 is now ready to evaluate equation (3), as follows. The register 24 is emptied by the control unit 70, which then selects the input 40 of the selector unit 38 and adds the coefficient $a_3$ into the empty register 24 via the selector units 44, 38, the adding and subtracting unit 26 and the selector unit 16. The control unit 70 then selects the input 36 of the selector unit 38, and, using the numbers $n_0'$ to $n_4'$ stored in the register 74, which numbers are again non-destructively read out in succession into the counter 76, causes successive recirculations of the loop 25 so as to multiply the number $a_3$ in the register 24 by the operator E', in a manner identical to that described with reference to the generation of the number Y. This process generates in the register 24 the number $a_3 \cdot E' = a_3/Y$. The coefficient $a_2$ is then added into the register 24 via the unit 26 to generate $$\frac{a_3}{Y} + a_2,$$

which is again multiplied by E' to generate $$\left(\frac{a_3}{Y} + a_2\right) \frac{1}{Y}.$$

Next, the coefficient $a_1$ is added to the register 24 to generate $$\left(\frac{a_3}{Y} + a_2\right) \frac{1}{Y} + a_1,$$

which is again multiplied by E' to generate $$\left[\left(\frac{a_3}{Y} + a_2\right) \frac{1}{Y} + a_1\right] \frac{1}{Y},$$

and finally $a_0$ is added into the register 24 to generate the required answer.

The sequence of operations hereinbefore described can conveniently be summarised as follows.

1. Load $x$ into the register 24.
2. Subtract S from $x$ to generate $x - S$ in register 24.
3. If $x - S$ is negative, select coefficients $a_0$ to $a_3$, while if $x - S$ is positive, select coefficients $b_0$ to $b_3$.
4. Add S back into the register 24 to regenerate $x$ in register 24.
5. Normalize $x$ and reduce to 1 by exponential progression, to determine and store numbers $n_0$ to $n_4$ corresponding to an operator $E = 1/x = Y$.
6. Apply operator E to register 24, to generate $1/Y$ therein.
7. Reduce $1/Y$ in register 24 to 1 by exponential progression to determine and store numbers $n_0'$ to $n_4'$ corresponding to an operator $E' = 1/Y$.
8. Add $a_3$ (or $b_3$) to empty register 24.
9. Apply operator E' to register 24, to generate $a_3/Y$ therein.

10. Add $a_2$ (or $b_2$) to contents of register 24 to generate $$\frac{a_3}{Y} + a_2$$

therein.

11. Apply operator E' to register 24, to generate $$\left(\frac{a_3}{Y} + a_2\right) \frac{1}{Y}$$

therein.

12. Add $a_1$ (or $b_1$) to contents of register 24 to generate $$\left(\frac{a_3}{Y} + a_2\right) \frac{1}{Y} + a_1$$

therein.

13. Apply operator E' to register 24, to generate $$\left[\left(\frac{a_3}{Y} + a_2\right) \frac{1}{Y} + a_1\right] \frac{1}{Y}$$

therein.

14. Add $a_0$ (or $b_0$) to contents of register 24 to generate $$\left[\left(\frac{a_3}{Y} + a_2\right) \frac{1}{Y} + a_1\right] \frac{1}{Y} + a_0$$

therein, which is the required answer.

In order to linearize the output from a different type of transducer, e.g. a different thermocouple or a resistance thermometer, and assuming that its output characteristic over the desired operating range can still be described to the required accuracy by two third order polynomial functions, it is merely necessary to appropriately change the values of the coefficients $a_0$ to $a_3$ and $b_0$ to $b_3$ and the magnitude S stored in the ROM 50. Higher order polynomials can also be dealt with relatively easily, merely by extending the ROM 50 to accept further coefficients and extending the ROM 90 to increase the number of add and divide recursions performed by the digital calculating apparatus 14.

While the embodiment of the apparatus 14 hereinbefore described is specifically dedicated to linearizing the output signal produced by a transducer, it will be appreciated that the apparatus 14 can be readily modified to serve as general purpose calculating apparatus capable of calculating a wide variety of functions. For example, the ROM 90 could be replaced by operator-controllable programming means, such as manually operable switches or a punched-tape reader, and the ROM 50 could contain inter alia terms $\log_{10} 2$, $\log_{10} 0.9$, $\log_{10} 1.01$ to enable the loop 25 to be selectively subjected to linear progressions as described in the aforementioned Patent Specification. Similarly, in the described embodiment of the invention, during the generation of the operators E and E' a single addition or subtraction is made prior to each test to see if the contents of the register 24 have exceeded or fallen below 1 respectively, so that $n_0$–$n_4$ and $n_0'$ to $n_4'$ are each made up of groups of one addition or subtraction, i.e. N = 1, and $n_0$–$n_4$ and $n_0'$–$n_4'$ single additions or subtractions are made in response to $n_0$–$n_4$ and $n_0' - n_4'$, i.e. M = 1. However, other integral values of N and M are possible, as long as N ⩾ M, for example to perform the square rooting operation described in the aforementioned Patent Specification.

Moreover, while the method of linearizing the output signal produced by a transducer described hereinbefore is performed by the special purpose (or dedicated) digital calculating apparatus 14, it will be appreciated that the method could also be readily performed by a suitably programmed general purpose computer. In this case, the sequence of operations set out earlier herein can be regarded as one suitable form of programme for such a computer.

What is claimed is:

1. Digital calculating apparatus comprising:
   a store;
   means for entering a first number in the store;
   a combining circuit connected between an input and an output of the store to form a recirculation loop therewith, the combining circuit including means for carrying out a combining operation on the first number in the store when the number is recirculated through the combining circuit, with successive combining operations serving to change the value of the first number in the store in a predetermined progression selected from the group comprising linear progression and exponential progression as said number is successively recirculated through the combining circuit;
   control means for successively recirculating the first number in the store through the combining circuit for a plurality of successive groups of N combining operations, where N is an integer greater than 0, to cause the first number in the store to converge upon a predetermined final value;
   counter means coupled to the output of the control means for counting and storing the number of N combining operations in each of said groups; and
   means for subsequently entering a second number in said store;
   the control means being responsive to the counter means to successively recirculate the second number in the store through the combining circuit for a plurality of groups of M combining operations, where M is an integer not greater than N, the number of M combining operations in each of said further groups being the same as the number of N combining operations in the corresponding ones of the first-mentioned groups.

2. Apparatus as claimed in claim 1, wherein said store comprises a random access memory.

3. Apparatus as claimed in claim 1, wherein said store comprises a shift register store.

4. Apparatus as claimed in claim 1, wherein the counter means comprises a counter for counting the number of N combining operations in each of said groups, and a second store arranged to store the respective count for each group.

5. Apparatus as claimed in claim 4, wherein the second store comprises a random access memory.

6. Apparatus as claimed in claim 4, wherein the second store comprises a shift register store.

7. Apparatus as claimed in claim 4, wherein the counter and the second store are arranged such that, prior to tthe performance of each further group of M combining operations, the count for that group is read out from the second store back into the counter, and the count in the counter is then decremented by one in response to each M combining operations performed, whereby when the count in the counter reaches zero the performance of that group of M combining operations is terminated.

8. Apparatus as claimed in claim 1, for linearizing a digital signal $x$ which varies in accordance with at least one polynomial function of at least the second order, wherein the integers N and M are both equal to one, and wherein there is provided a third store for storing the coefficients of said at least one polynomial function of $x$, the arrangement being such that, in operation, the reciprocal of $x$ is entered in the store as said first number and changed by exponential progression to a target value of one, the highest order coefficient is entered into the store as said second number and changed by exponential progression, in response to the stored numbers in the counter means, so as to divide said highest order coefficient by said reciprocal, the remaining coefficients down to the first order coefficient are successively additively entered in the store in decreasing order, the number in the store after each addition being changed by exponential progression, in response to said stored numbers in the counter means, so as to divide the number in the store after each addition by said reciprocal, and the final coefficient is additively entered in the store.

9. Apparatus as claimed in claim 8, further including means for entering said reciprocal of $x$ in the store in a preliminary operation, in which $x$ is entered in the store as said first number and changed by exponential progression to a target value of one, which target value serves as the second number and is changed by exponential progression, in response to the stored numbers in the counter means, so as to produce said reciprocal.

* * * * *